United States Patent
Fleischer et al.

(10) Patent No.: US 10,682,961 B2
(45) Date of Patent: Jun. 16, 2020

(54) UNLOCKABLE LUGGAGE COMPARTMENT FLOOR DEVICE FOR A LUGGAGE COMPARTMENT OF A MOTOR VEHICLE

(71) Applicant: Bayerische Motoren Werke Aktiengesellschaft, Munich (DE)

(72) Inventors: Walter Fleischer, Neufahrn b. Freising (DE); Joerg Wichert, Groebenzell (DE); Gerhard Guenther, Markt Indersdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 109 days.

(21) Appl. No.: 15/977,518

(22) Filed: May 11, 2018

(65) Prior Publication Data

US 2018/0257573 A1 Sep. 13, 2018

Related U.S. Application Data

(63) Continuation of application No. PCT/EP2016/069215, filed on Aug. 12, 2016.

(30) Foreign Application Priority Data

Nov. 13, 2015 (DE) ........................ 10 2015 222 481

(51) Int. Cl.
    *B60R 5/04* (2006.01)
    *E05B 79/20* (2014.01)

(52) U.S. Cl.
    CPC ................ *B60R 5/04* (2013.01); *B60R 5/044* (2013.01); *E05B 79/20* (2013.01)

(58) Field of Classification Search
    CPC .. B60R 5/04; B60R 5/044; B60R 7/02; B62D 43/00; B62D 43/005; E05B 79/20
(Continued)

(56) References Cited

U.S. PATENT DOCUMENTS

| | | | |
|---|---|---|---|
| 6,247,741 B1 | 6/2001 | Seel et al. | |
| 6,439,633 B2 * | 8/2002 | Nemoto | B60P 7/0876 296/37.14 |

(Continued)

FOREIGN PATENT DOCUMENTS

| | | |
|---|---|---|
| DE | 198 54 365 A1 | 6/2000 |
| DE | 20 2006 007 784 U1 | 8/2006 |

(Continued)

OTHER PUBLICATIONS

English translation of JP 2007-203977; retreived on Oct. 23, 2019 via PatentTranslate located at www.epo.org. (Year: 2019).*

(Continued)

Primary Examiner — Jason S Daniels
(74) *Attorney, Agent, or Firm* — Crowell & Moring LLP

(57) ABSTRACT

A luggage compartment floor device for a luggage compartment of a motor vehicle has a first luggage compartment floor element, at least one second luggage compartment floor element which can be moved respectively between a closed position at least partially covering a stowage space located therebelow and an open position at least partially opening same, and a locking device which is arranged on a luggage compartment floor element and is used to lock or release the movement. To this end, the locking device has a single handle which is actively connected to both the first luggage compartment floor element and the at least second luggage compartment floor element.

16 Claims, 4 Drawing Sheets

(58) Field of Classification Search
USPC .................... 296/37.1, 37.2, 37.14, 37.16
See application file for complete search history.

(56) References Cited

U.S. PATENT DOCUMENTS

| | | | | |
|---|---|---|---|---|
| 9,499,086 | B2 * | 11/2016 | Gaudig | B60P 1/64 |
| 2005/0285422 | A1 * | 12/2005 | Bartos | B60R 5/04 |
| | | | | 296/26.09 |
| 2010/0078956 | A1 * | 4/2010 | Aebker | B60R 5/04 |
| | | | | 296/37.13 |

FOREIGN PATENT DOCUMENTS

| | | |
|---|---|---|
| DE | 60 2005 003 406 T2 | 9/2008 |
| DE | 10 2008 019 394 A1 | 10/2009 |
| DE | 10 2008 060 485 A1 | 6/2010 |
| DE | 10 2013 217 567 A1 | 3/2015 |
| DE | 10 2014 225 630 A1 | 6/2015 |
| EP | 1 619 077 A1 | 1/2006 |
| JP | 2007-203977 A | 8/2007 |

OTHER PUBLICATIONS

German-language Office Action issued in counterpart German Application No. 10 2015 222 481.3 dated Jul. 19, 2016 (Ten (10) pages).
International Search Report (PCT/ISA/210) issued in PCT Application No. PCT/EP2016/069215 dated Nov. 21, 2016 with English-language translation (Five (5) pages).

* cited by examiner

UNLOCKABLE LUGGAGE COMPARTMENT FLOOR DEVICE FOR A LUGGAGE COMPARTMENT OF A MOTOR VEHICLE

CROSS REFERENCE TO RELATED APPLICATIONS

This application is a continuation of PCT International Application No. PCT/EP2016/069215, filed Aug. 12, 2016, which claims priority under 35 U.S.C. § 119 from German Patent Application No. 10 2015 222 481.3, filed Nov. 13, 2015, the entire disclosures of which are herein expressly incorporated by reference.

BACKGROUND AND SUMMARY OF THE INVENTION

The present invention relates to an unlockable luggage floor device for a luggage compartment of a motor vehicle and to a motor vehicle which is equipped with a corresponding luggage floor device.

DE 10 2013 217 567 A1 discloses a luggage compartment floor device for a luggage compartment of a motor vehicle, said device having a first luggage compartment floor element and at least one second luggage compartment floor element. Each of the two luggage compartment floor elements is situated at least partially above a stowage space. Moreover, each luggage compartment floor element has a locking device by which the respective luggage compartment floor element can be blocked or released in order to at least partially cover or open the respective stowage space. This technical solution, which functions well in practice per se, is of comparatively complicated design.

It is an object of the present invention to overcome this disadvantage of the prior art and to provide a luggage compartment floor device which has a simplified design.

This and other objects are achieved by a luggage compartment floor device for a luggage compartment of a motor vehicle having a first luggage compartment floor element and at least one second luggage compartment floor element which can each be moved between a closed position in which they at least partially cover a stowage space situated therebelow and an open position in which they at least partially open the space. A locking device is situated on a luggage compartment floor element and blocks or releases the movement. The locking device has a handle which is operatively connected both to the first luggage compartment floor element and to the at least second luggage compartment floor element.

As a departure from what is known from the prior art, only a single handle is now required in order to block or release the luggage compartment floor elements. In an advantageous manner, this facilitates the production of the luggage compartment floor device according to the invention, not least through a reduced number of required parts by comparison with the prior art. Moreover, the operation of the luggage compartment floor device is very simple since now only a single handle has to be operated by a user.

According to a preferred embodiment of the luggage compartment floor device according to the invention, the handle actuated locking device selectively releases or blocks the first luggage compartment floor element and/or the at least second luggage compartment floor element. This advantageously creates a high degree of practical use for an operator since the latter can open and close the luggage compartment floor device according to the invention to suit his needs.

The handle can be operatively connected to at least one first locking element arranged on the first luggage compartment floor element and to at least one second locking element which is arranged on the second luggage compartment floor element. This advantageously creates a simple design of the luggage compartment floor device according to the invention.

This applies above all to the case where a first Bowden cable, which is operatively connected both to the handle and to the first locking element, and/or a second Bowden cable is or are provided, which second Bowden cable is operatively connected both to the handle and to the second locking element.

For further improved securement or locking of a luggage compartment floor element, according to a preferred embodiment there is provided a retaining tongue which is operatively connected both to the handle and to a third locking element which selectively releases and locks the first or the second luggage compartment floor element.

A particularly simple and reliable design of the luggage compartment floor device according to the invention is created if the handle has at least one spring element by means of which the first, second and/or third locking elements can be moved under spring force loading into a locking position and can be held therein.

In principle, there can be provision according to the invention that the first luggage compartment floor element and the second luggage compartment floor element form a constituent part which is always present in the luggage compartment floor device according to the invention. However, according to a preferred embodiment, there can also be provision that the second Bowden cable has a first portion which is situated on the first luggage compartment floor element, and a second portion which is situated on the second luggage compartment floor element, which portions are releasably connected to one another by a coupling device. This advantageously makes it possible for one luggage compartment floor element to be reversibly separated from the other luggage compartment floor element and thus to be removed temporarily or permanently from the luggage compartment floor device.

The aforementioned object is also achieved by a motor vehicle having the features of the luggage compartment floor device disclosed above. The corresponding advantages apply appropriately.

According to a preferred embodiment of the motor vehicle according to the invention, the first luggage compartment floor element is situated in the region of the part of the luggage compartment that is adjacent to the vehicle rear, and the at least second luggage compartment floor element, which is adjacent to the first luggage compartment floor element, is situated in the direction of the vehicle front. This advantageously improves the comfort for a user of the luggage compartment floor device according to the invention.

This likewise applies to the case if the second luggage compartment floor element is pivotably mounted at its end distally remote from the first luggage compartment floor element and/or the first luggage compartment floor element is designed to be removable from the motor vehicle.

Other objects, advantages and novel features of the present invention will become apparent from the following detailed description of one or more preferred embodiments when considered in conjunction with the accompanying drawings.

BRIEF DESCRIPTION OF THE DRAWINGS

A detailed, nonprejudicial, in particular nonlimiting, description of exemplary embodiments of the present invention is given below with reference to FIGS. 1 to 4. Like elements are provided with identical reference signs unless stated otherwise.

DETAILED DESCRIPTION OF THE DRAWINGS

Figure 1:
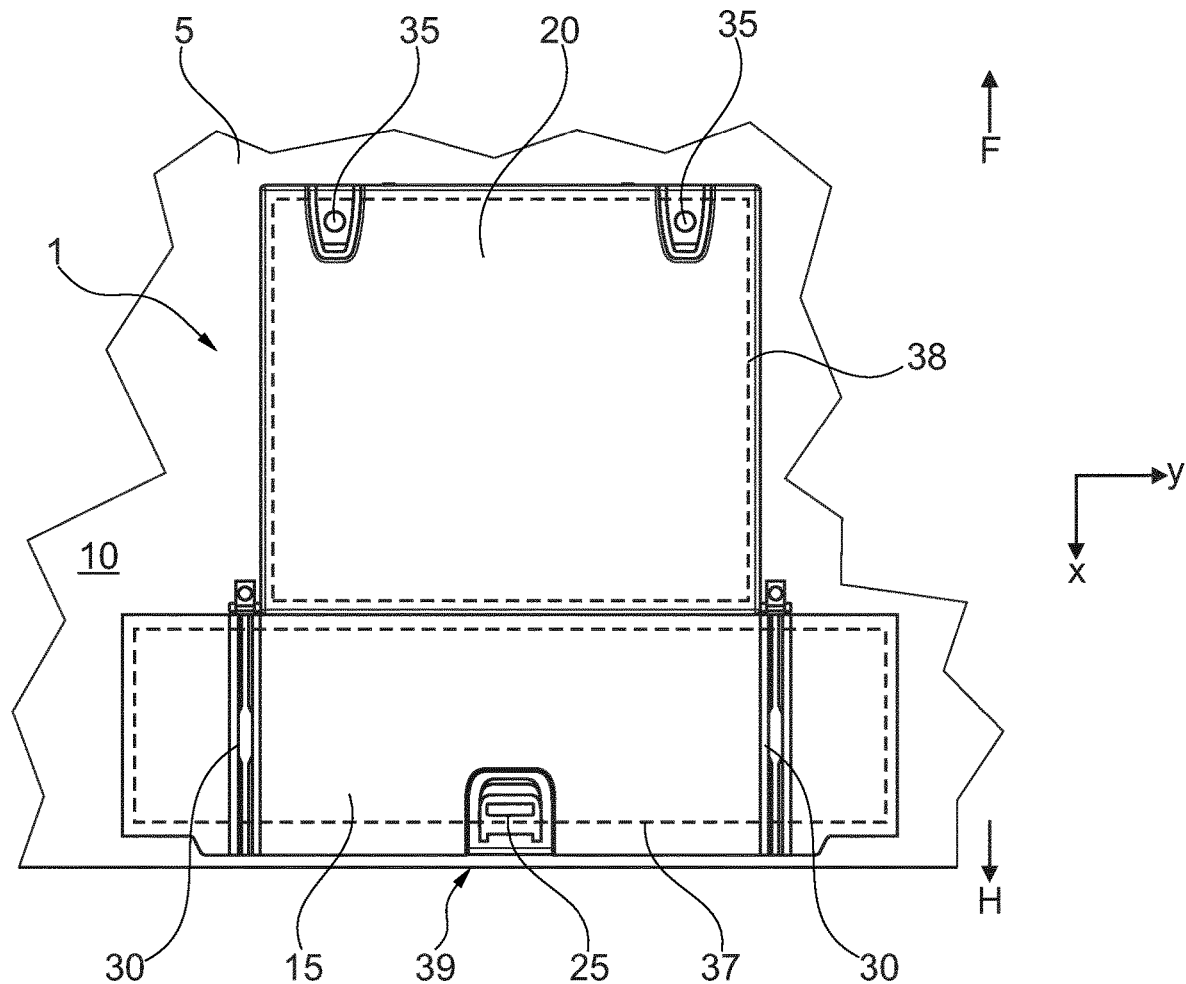
FIG. 1 is a plan view of a luggage compartment floor device according to an embodiment of the invention in a luggage compartment of a motor vehicle.

FIG. 1 is a plan view of a luggage compartment floor device 1 according to an embodiment of the invention in a luggage compartment 5 of a motor vehicle 10. The luggage compartment floor device 1 has a first luggage compartment floor element 15 situated in the rear region H of the motor vehicle 10, and a second luggage compartment floor element 20 which is situated in the region of the vehicle front F, which floor elements are adjacent to one another in a manner known per se. On the first luggage compartment floor element 15 there are arranged, on the one hand, a handle 25 and, on the other hand, two optional lashing rails 30, which are likewise known per se. At its end distally remote from the first luggage compartment floor element 15, the second luggage compartment floor element 20 has two hinges 35, which are likewise known per se and about which it is pivotably mounted. It should be noted that there can also be provided pivoting means other than hinges or means allowing a translational movement of the second luggage compartment floor element 20. A first stowage space 37 is situated below the first luggage compartment floor element 15. A second stowage space 38 is situated below the second luggage compartment floor element 20.

With the handle 25, it is possible by way of a locking device 39 for both the first luggage compartment floor element 15 and the second luggage compartment floor element 20 to be unlocked individually and/or jointly from a locking position, in which they are mounted substantially flat in the interior 5 of the motor vehicle 10, into a release position. The first luggage compartment floor element 15 and the second luggage compartment floor element 20 can also be transferred again from the release position into a locking position.

Figure 2:
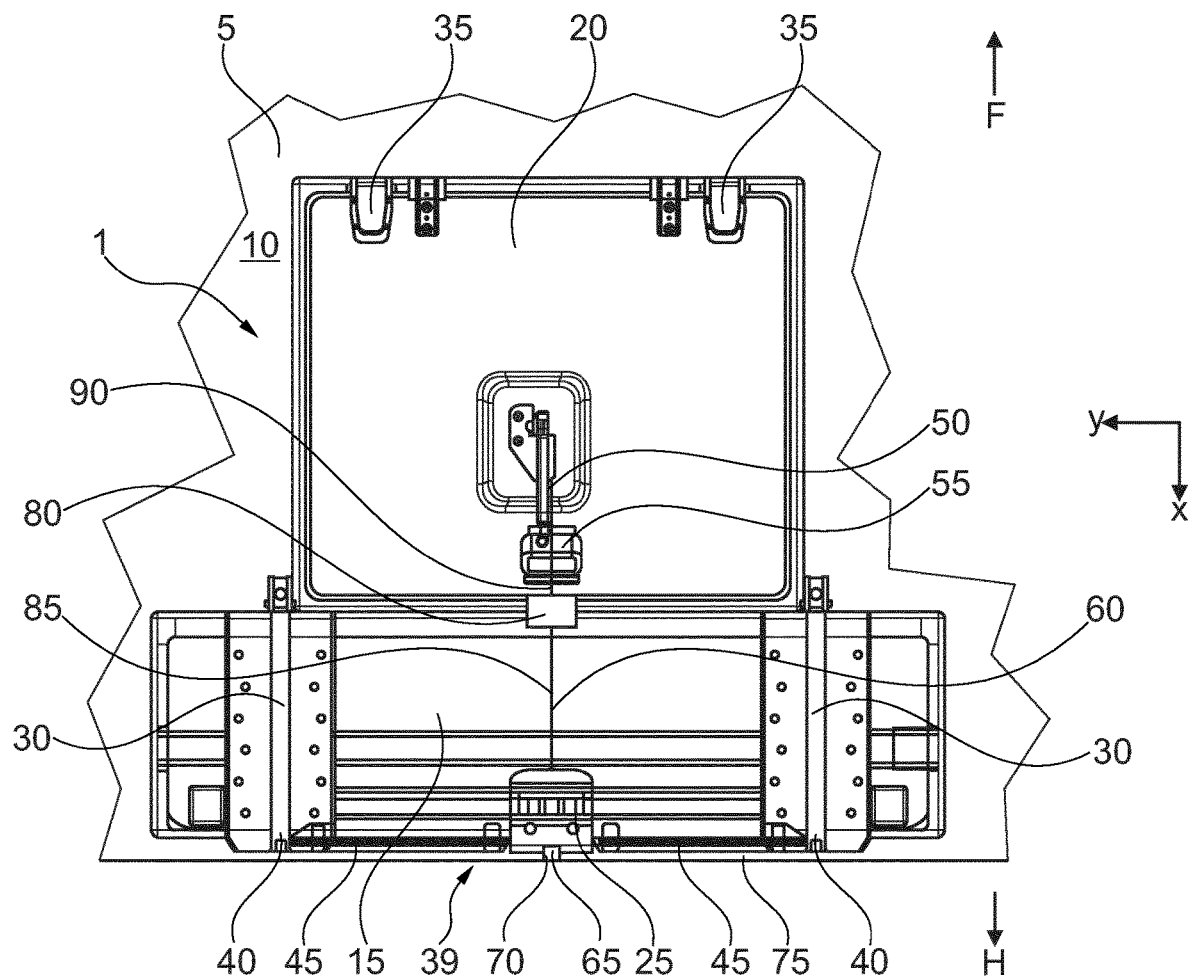
FIG. 2 illustrates the luggage compartment floor device shown in FIG. 1 in a bottom view.

In FIG. 2, the luggage compartment floor device 1 shown in FIG. 1 is now illustrated from below, i.e. viewed as it were from the first stowage space 37 and the second stowage space 38. The handle 25 is operatively connected to two first locking elements 40 which are represented symbolically here. The operative connection itself occurs by way of, in each case, a first Bowden cable 45 which is arranged, on the one hand, on the handle 25 and, on the other hand, on the respective first locking element 40. A movement of the handle 25 leads to a displacement of the respective first Bowden cable 45, with the result that the respective first locking element 40 is released or blocked. It should be noted that, instead of first Bowden cables 45, there can also be provided push rods or similar means which are rigid when pushed.

Situated on the lower side of the second luggage compartment floor element 20 is a gas pressure damper 50 which applies pressure to the lower side of the luggage compartment floor element 20. Consequently, the second luggage compartment floor element 20 has the tendency to pivot about the hinges 35. It should be noted that a gas pressure damper 50 of the type shown here can also be dispensed with. In such a case, the second luggage compartment floor element 20 does not pivot open automatically; rather—should no other automatic adjustment device (not shown) be provided—said floor element then has to be manually lifted or removed by a user.

In order to prevent a pivoting movement of the second luggage compartment floor element 20 that is not desired by a user (not shown), the luggage compartment floor device 1 has a second locking element 55 which is operatively connected to the handle 25. For the purpose of operative connection between the second locking element 55 and the handle 25, a second Bowden cable 60 is provided, with the result that a movement of the handle 25 leads to a release of the second locking element 55 and consequently to a pivoting of the second luggage compartment floor element 20. For the case where the first luggage compartment floor element 15 and/or the second luggage compartment floor element 20 are intended to be removable from the luggage compartment 5 of the motor vehicle 10, a coupling device 80 is provided. The coupling device 80 couples a first portion 85 of the second Bowden cable 60 that is situated on the first luggage compartment floor element 15 to a second portion 90 of said Bowden cable 60 that is arranged on the second luggage compartment floor element 20. Therefore, the coupling device 80 is situated in the bounding portion of the first luggage compartment floor element 15 and second luggage compartment floor element 20. It should be noted that, instead of a Bowden cable 60, any other means which is rigid when pushed, in particular a rod, can also be provided in order to transmit a movement of the handle 25 to the second locking element 55.

As can also be gathered from FIG. 2, the handle 25 finally has a third locking element 65 which is designed as a retaining tongue 70 and is operatively connected to a loading edge 75 which is situated in the rear region H of the motor vehicle 10.

Therefore, the first luggage compartment floor element 15 and the second luggage compartment floor element 20 can be released or blocked by operation of the handle 25, which is provided as a single handle in the case of the luggage compartment floor device 1 according to the invention. In other words, there is provision in the luggage compartment floor device 1 according to the invention that the handle 25 releases the first luggage compartment floor element 15 in a first operative position in that the first locking element 40, the second locking element 55 and the optionally provided third locking element 65 (retaining tongue 70) are unlocked. In a second operative position of the handle 25, the second locking element 55 is unlocked, with the result that the second luggage compartment floor element 20 is released.

The locking itself can occur in a manner known per se: thus, each of the Bowden cables 45, 60 (or push rods) can be operatively connected to a locking block which is not shown here. In the locking position, the locking block engages in a latching eye, which is likewise not shown, of a motor vehicle-mounted retaining element and is connected thereto, for example in a form-fitting manner. Upon release of the lock, the locking block slides out of the latching eye, with the result that the Bowden cables 45, 60 (or push rods) are free and not held at their respective ends remote from the handle 25.

Figure 3:
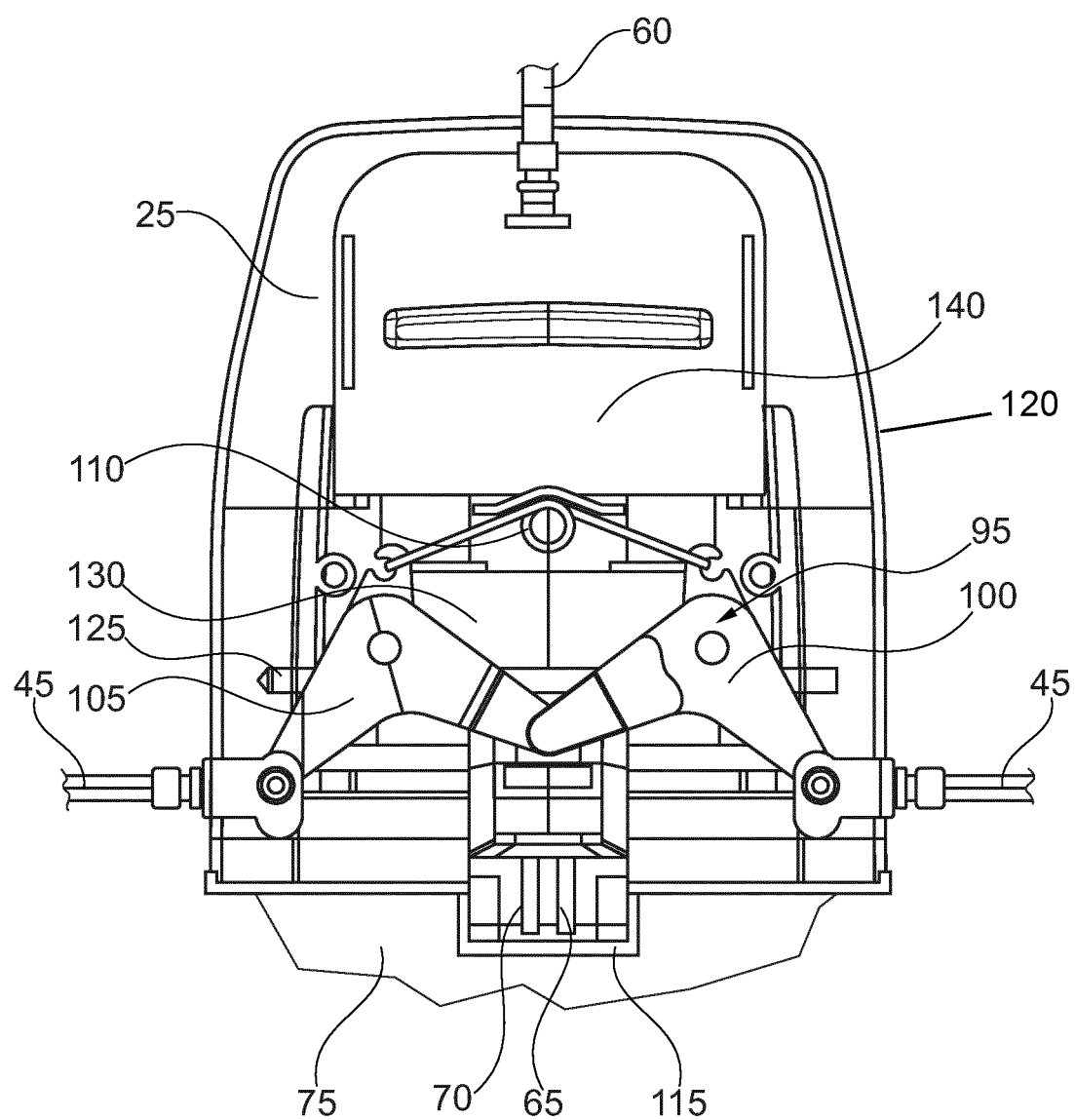
FIG. 3 is a detail view of the handle shown in FIG. 2.

In FIG. 3, the handle 25 is now shown in detail in a bottom view in a starting position or locking positon. In the starting position, the first luggage compartment floor element 15 and the second luggage compartment floor element 20 are arranged and locked, in particular flat, in the interior 5 of the motor vehicle 10.

The ends of the first Bowden cables 45 (or push rods) that are adjacent to the handle 25 are coupled to a toggle lever 95 which comprises two lever elements 100, 105. A spring element 110 holds the toggle lever 95 under prestress, with the result that the respective locking block (not shown) is held under spring loading in the latching eye.

The third locking element 65 is also coupled to the toggle lever 95 and prestressed by the spring element 110. The coupling occurs in such a way that, upon a movement of the two lever elements 100, 105, the retaining tongue 70 is removed from a receptacle 115 of the loading edge 75 (this corresponds to a movement of the retaining tongue 70 in FIG. 3 in the upward direction).

For the purpose of moving the two lever elements 100, 105, there is provided a first actuating grip 130 which is pivotable in a grip shell 120 of the handle 25 about a pivot axis 125 and which is operatively connected to the toggle lever 95. In an inoperative position of the first actuating grip 125, the spring element 110 is, as described above, prestressed and the first locking elements 40 are locked. In the release position, the first actuating grip 130 is pivoted about the pivot axis 125 in such a way that the spring force acting on the two lever elements 100, 105 by the spring element 110 is reduced, with the result that uncoupling of the first Bowden cables 45 from the first locking elements 40 occurs in the manner described above.

In addition to the first actuating grip 130, a second actuating grip 140 is accommodated on the grip shell 120, on which actuating grip there is arranged one end of the second Bowden cable 60 which is connected by its other end to the second locking element 55. During a movement of the second actuating grip 140 that is translational according to the embodiment present here (the movement occurring in FIG. 3 in the downward direction), the end of the second Bowden cable 60 that is shown in FIG. 3 moves in the direction of the loading edge 75, with the result that the second blocking element 55 shown in FIG. 2 is unlocked and the second luggage compartment floor element 20 is moved from its starting position into an opened-out position.

It should be noted that the first actuating grip 130 and the second actuating grip 140 can be operatively uncoupled from one another. This means that an actuation of the first actuating grip 130 can occur independently of an actuation of the second actuating grip 140. However, it is also possible for the first actuating grip 130 and the actuating grip 140 to be functionally coupled to one another. This results in the first actuating grip 130 and the second actuating grip 140 being functionally integrated with one another such that only a single actuating grip (not shown here) is required on the handle 25 for actuating the first Bowden cable 45 and the second Bowden cable 60.

Figure 4:
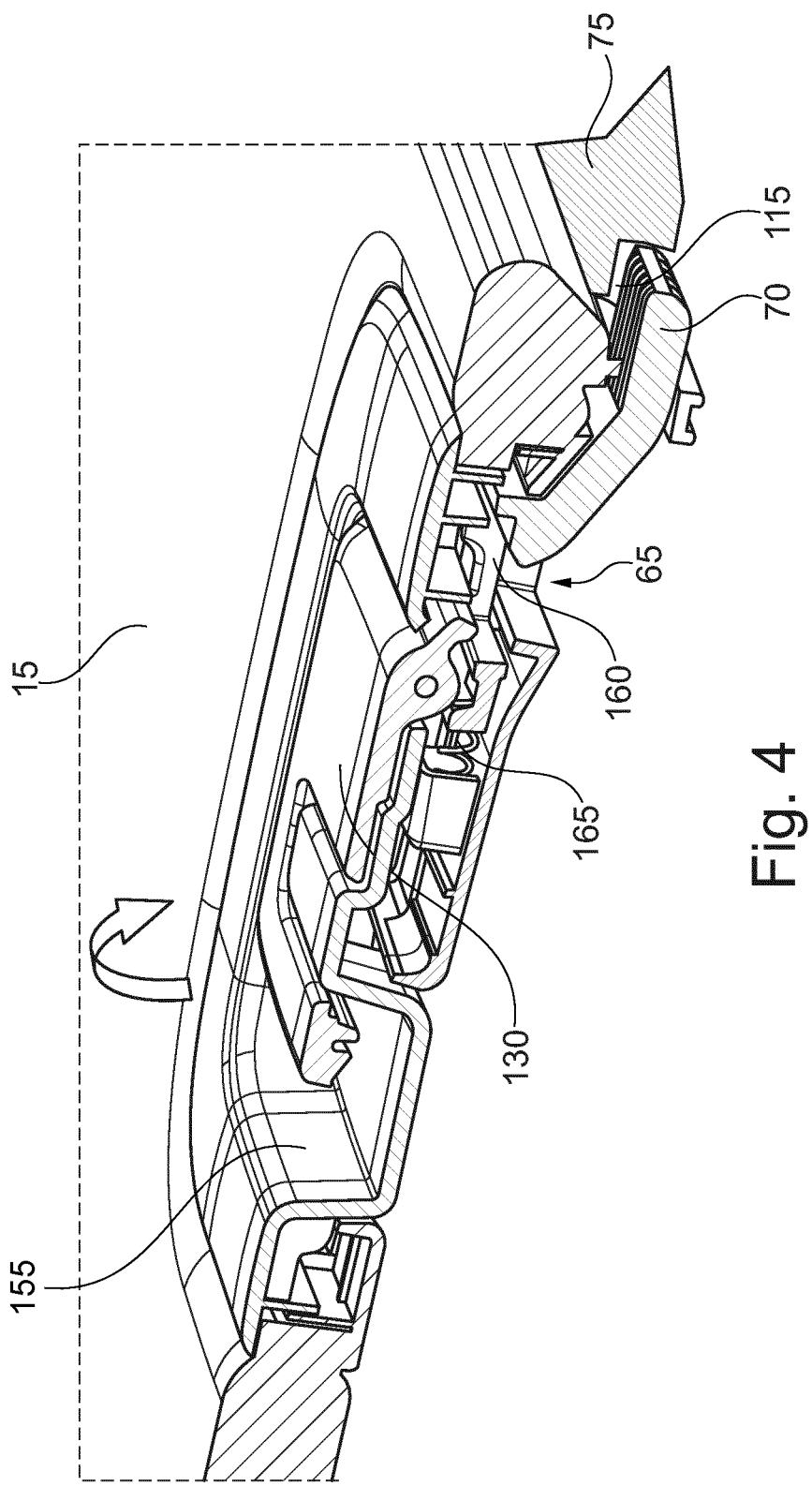
FIG. 4 is a perspective sectional view of an alternative to the handle shown in FIG. 3.

FIG. 4 is a perspective sectional view showing an alternative handle 155 to the handle 25 shown in FIG. 3. As a departure from the embodiment shown in FIG. 3, no first Bowden cable 45 is provided. Rather, locking of the first luggage compartment floor element 15 occurs by the third locking element 65 alone, the retaining tongue 70 thereof engaging in the receptacle 115 of the loading edge 75. The third locking element 65 comprises a driver 160 which is operatively connected, on the one hand, to the retaining tongue 70 and, on the other hand, to a compression spring 165 which is designed as a cylinder spring in the exemplary embodiment shown here, and is prestressed by said spring. During a movement of the first actuating grip 130 about the pivot axis 125 in a direction represented symbolically by an arrow, the driver 160 in FIG. 4 is displaced to the left, with the result that the retaining tongue 70 comes out of the receptacle 115 of the loading edge 75. As a result, the first luggage compartment floor element 15 is unlocked and can be pivoted with respect to the luggage compartment 5 of the motor vehicle 10 or removed therefrom. During the corresponding operation, the compression spring 165 is compressed and held by a latch which is not shown here. Upon reinserting or pivoting back the first luggage compartment floor element 15, the latch (not shown) releases the retaining tongue 70 again in such a way that it can be accommodated in the receptacle 115.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Luggage compartment floor device
5 Luggage compartment
10 Motor vehicle
15 First luggage compartment floor element
20 Second luggage compartment floor element
25 Handle
30 Lashing rails
35 Hinges
37 First stowage space
38 Second stowage space
39 Locking device
40 First locking elements
45 First Bowden cable
50 Gas pressure damper
55 Second locking element
60 Second Bowden cable
65 Third locking element
70 Retaining tongue
75 Loading edge
80 Coupling device
85 First portion
90 Second portion
95 Toggle lever
100 Lever element
105 Lever element
110 Spring element
115 Receptacle
120 Grip shell
125 Pivot axis
130 First actuating grip
140 Second actuating grip
155 Handle
160 Driver
165 Compression spring
F Vehicle front
H Vehicle rear
x, y, z Cartesian coordinates of a vehicle-specific coordinate system

What is claimed is:
1. A luggage compartment floor device for a luggage compartment of a motor vehicle, comprising:

a first luggage compartment floor element;

at least one second luggage compartment floor element, wherein the first and second luggage compartment floor elements are respectively movable between a closed position in which they at least partly cover a stowage space situated therebelow and an open position in which they at least partially open said space; and a locking device that is situated on the first luggage compartment floor element, wherein the locking device includes a handle that is operatively connected both to the first luggage compartment floor element and to the at least second luggage compartment floor element such that the locking device is thereby configured to:

separately unlock each of the first and second luggage compartment floor elements to thereby release the respective movement.

2. The luggage compartment floor device as claimed in claim 1, wherein the locking device selectively blocks or releases the first luggage compartment floor element and/or the at least second luggage compartment floor element via actuation of the handle.

3. The luggage compartment floor device as claimed in claim 1, wherein the handle is operatively connected to at least one first locking element arranged on the first luggage compartment floor element and to at least one second locking element arranged on the second luggage compartment floor element.

4. The luggage compartment floor device as claimed in claim 3, further comprising:

a first Bowden cable which is operatively connected both to the handle and to the first locking element, and/or a second Bowden cable which is operatively connected both to the handle and to the second locking element.

5. The luggage compartment floor device as claimed in claim 4, wherein the second Bowden cable has a first portion which is situated on the first luggage compartment floor element, and a second portion which is situated on the second luggage compartment floor element, which first and second portions are releasably connected to one another by a coupler.

6. The luggage compartment floor device as claimed in claim 3, further comprising:

a retaining tongue which is operatively connected both to the handle and to a third locking element which selectively blocks and releases the first luggage compartment floor element or the second luggage compartment floor element.

7. The luggage compartment floor device as claimed in claim 6, wherein the handle has at least one spring element by which the first, second and/or third locking element are movable under spring force loading into a locking position and held therein.

8. A motor vehicle, comprising a luggage compartment floor element as claimed in claim 1.

9. The motor vehicle as claimed in claim 8, wherein the first luggage compartment floor element is situated in a region of a part of the luggage compartment that is adjacent to a vehicle rear, and the at least second luggage compartment floor element is situated, adjacent to the first luggage compartment floor element, in a direction of a vehicle front.

10. The motor vehicle as claimed in claim 9, wherein the second luggage compartment floor element is pivotably mounted at its end distally remote from the first luggage compartment floor element, and/or the first luggage compartment floor element is removable from the motor vehicle.

11. The motor vehicle as claimed in claim 8, wherein the locking device selectively blocks or releases the first luggage compartment floor element and/or the at least second luggage compartment floor element via actuation of the handle.

12. The motor vehicle as claimed in claim 8, wherein the handle is operatively connected to at least one first locking element arranged on the first luggage compartment floor element and to at least one second locking element arranged on the second luggage compartment floor element.

13. The motor vehicle as claimed in claim 12, wherein a first Bowden cable which is operatively connected both to the handle and to the first locking element, and/or a second Bowden cable which is operatively connected both to the handle and to the second locking element.

14. The motor vehicle as claimed in claim 13, wherein the second Bowden cable has a first portion which is situated on the first luggage compartment floor element, and a second portion which is situated on the second luggage compartment floor element, which first and second portions are releasably connected to one another by a coupler.

15. The motor vehicle as claimed in claim 12, wherein a retaining tongue which is operatively connected both to the handle and to a third locking element which selectively blocks and releases the first luggage compartment floor element or the second luggage compartment floor element.

16. The motor vehicle as claimed in claim 15, wherein the handle has at least one spring element by which the first, second and/or third locking element are movable under spring force loading into a locking position and held therein.

* * * * *